United States Patent
Pratt et al.

(10) Patent No.: US 10,995,222 B2
(45) Date of Patent: May 4, 2021

(54) MILK LUMILUX DISPERSION

(71) Applicant: HONEYWELL INTERNATIONAL INC., Morris Plains, NJ (US)

(72) Inventors: Jeffrey Pratt, Budd Lake, NJ (US); Gary Martin, Piscataway, NJ (US); Karl J. Smith, Sparta, NJ (US); Eric Rainal, Morristown, NJ (US); Robert Catena, Stockholm, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 47 days.

(21) Appl. No.: 15/983,801

(22) Filed: May 18, 2018

(65) Prior Publication Data

US 2018/0334576 A1    Nov. 22, 2018

Related U.S. Application Data

(60) Provisional application No. 62/509,097, filed on May 20, 2017.

(51) Int. Cl.
| | |
|---|---|
| *C09D 5/22* | (2006.01) |
| *C09D 127/12* | (2006.01) |
| *C09K 11/02* | (2006.01) |
| *C09K 11/06* | (2006.01) |

(Continued)

(52) U.S. Cl.
CPC ................ *C09D 5/22* (2013.01); *C08J 7/042* (2013.01); *C08J 7/0427* (2020.01); *C09D 127/12* (2013.01); *C09K 11/02* (2013.01); *C09K 11/06* (2013.01); *C08J 2327/12* (2013.01);

(Continued)

(58) Field of Classification Search
CPC ..................................................... C09D 127/12
See application file for complete search history.

(56) References Cited

U.S. PATENT DOCUMENTS

| | | | | |
|---|---|---|---|---|
| 3,006,881 | A | * | 10/1961 | Bolstad ................. C08F 214/18 524/773 |
| 5,424,006 | A | | 6/1995 | Murayama et al. |
| 5,453,477 | A | | 9/1995 | Oxenrider et al. |

(Continued)

FOREIGN PATENT DOCUMENTS

| | | |
|---|---|---|
| CN | 102848667 | 1/2013 |
| CN | 103627199 | 3/2014 |

(Continued)

OTHER PUBLICATIONS

Extended European Search Report for EP App. No. 18805172.6.

*Primary Examiner* — Ian A Rummel
(74) *Attorney, Agent, or Firm* — Roberts & Roberts, LLP; Richard S. Roberts, Jr.

(57) ABSTRACT

Luminescent compositions are provided having improved color intensity and articles incorporating said luminescent compositions as security taggants, for example as anti-counterfeiting components in pharmaceutical packaging applications, or as aesthetic colorants that are generally usable in any application where luminescent coloration is desired. The luminescent compositions incorporate a particulate fluoropolymer that is blended with one or more luminescent pigments and/or luminescent dyes. These components are provided in a liquid medium in which the fluoropolymer particles are dispersed and with which the pigment(s)/dye(s) may or may not be soluble.

20 Claims, 3 Drawing Sheets

(51) Int. Cl.
    *C08J 7/04*      (2020.01)
    *C08K 5/56*      (2006.01)
(52) U.S. Cl.
    CPC ............ *C08J 2427/12* (2013.01); *C08K 5/56* (2013.01); *C09K 2211/182* (2013.01)

(56) References Cited

U.S. PATENT DOCUMENTS

| | | |
|---|---|---|
| 5,674,437 A | 10/1997 | Geisel |
| 5,888,424 A | 3/1999 | Ebnesajjad et al. |
| 5,955,556 A | 9/1999 | McCarthy et al. |
| 6,255,384 B1 | 7/2001 | McCarthy et al. |
| 6,365,684 B1 | 4/2002 | McCarthy et al. |
| 6,369,178 B1 | 4/2002 | McCarthy |
| 7,122,248 B2 | 10/2006 | Tam et al. |
| 7,674,532 B2 | 3/2010 | Einhorn et al. |
| 9,250,183 B2 | 2/2016 | Smith et al. |
| 2002/0150734 A1 * | 10/2002 | Snow ................ B32B 27/30 428/195.1 |
| 2003/0194578 A1 | 10/2003 | Tam et al. |
| 2008/0148837 A1 | 6/2008 | Auslander et al. |
| 2008/0152826 A1 | 6/2008 | Crawford et al. |
| 2009/0255460 A1 * | 10/2009 | Castelli ............ B41J 11/0015 118/46 |
| 2010/0062194 A1 | 3/2010 | Sun |
| 2010/0295287 A1 | 11/2010 | Reichert et al. |
| 2011/0260945 A1 * | 10/2011 | Karasawa ............ C09D 127/18 343/873 |

FOREIGN PATENT DOCUMENTS

| | | |
|---|---|---|
| DE | 4310082 | 9/1994 |
| EP | 1046687 A1 * | 10/2000 ............ C09D 11/17 |
| EP | 1425990 | 6/2004 |
| GB | 2462668 | 2/2010 |
| JP | 2008115225 | 5/2008 |
| WO | 2019002046 | 1/2019 |

\* cited by examiner

MILK LUMILUX DISPERSION

CROSS-REFERENCE TO RELATED APPLICATION

This application claims the benefit of co-pending U.S. Provisional Application Ser. No. 62/509,097, filed on May 20, 2017, the disclosure of which is incorporated by reference herein in its entirety.

BACKGROUND

Technical Field

This disclosure relates to luminescent colorant compositions suitable for use in anti-counterfeiting and other applications.

Description of the Related Art

The counterfeiting of consumer products is a widespread problem that plagues governments and manufacturers around the world across a broad range of industries. This is particularly a problem in the pharmaceutical industry where drug counterfeiting is common and sophisticated and poses a serious danger to consumers. In the United States, comprehensive laws and regulations are in place to combat drug counterfeiting so that consumers can be confident in the authenticity of the drugs they purchase legally. However, with the rising costs of pharmaceuticals in recent years, millions of U.S. consumers are making the choice to buy their prescription drugs from cheaper sources outside the U.S. Canada, for example, regulates the price of drugs, often making them much more affordable than drugs purchased in the U.S., so many U.S. consumers travel across the border to purchase their medicines at lower prices. However, for many consumers a trip to Canada is unrealistic and they resort to illegally purchasing their drugs from internet pharmacies that may or may not be legitimate and who may or may not be providing authentic products. This poses a serious danger to consumers as well as causes significant harm to the business of the drug maker.

Even when drugs are legally obtained within the U.S., counterfeiting is a continuous and growing problem. Sophisticated counterfeiting activities and methods are being used to introduce finished dosage form counterfeits into the otherwise legitimate U.S. drug distribution system. These counterfeit drugs often closely resemble legitimate drugs yet may contain only inactive ingredients, incorrect ingredients, improper dosages, sub-potent or super-potent ingredients, or may be contaminated. Accordingly, drug counterfeiting poses very real public health and safety concerns for consumers.

Conventional pharmaceutical authentication efforts have been focused on solutions such as color-shifting inks, holograms or taggants covertly inserted in packaging or chemical markers embedded in a drug or its label. For example, U.S. Pat. No. 6,647,649 teaches a microparticle taggant system for products or product packages that incorporates microparticle taggants having predetermined, verifiable numeric codes. U.S. Pat. No. 9,361,561 teaches the incorporation of luminescent markers into industrial process materials such as concrete, timber, mineral ore, plastics, fibers, paint, metal, explosive materials, and even food, for tracking and verification purposes. However, each of these solutions has become easily replicated by counterfeiters.

An alternative, highly successful solution is taught in U.S. Pat. No. 7,674,532, which is commonly-owned by the present assignee and which is incorporated herein by reference to the extent consistent herewith. U.S. Pat. No. 7,674,532 provides an anti-counterfeiting package construction that incorporates luminescent taggants positioned between two film layers or blended within a polymeric film layer. This taggant system is virtually impossible to replicate and meets FDA requirements related to the proximity of taggants to the drug. It is also particularly desirable for use in pharmaceutical packaging materials because the luminescent taggants are compatible with clear fluoropolymer films, such as ACLAR® films manufactured by Honeywell International Inc. of Morris Plains, N.J., which are transparent to short ultraviolet (UV) light, i.e. radiation in the 200 nm to 300 nm range, whereas other clear packaging materials are not. The present disclosure provides an improvement to this method of U.S. Pat. No. 7,674,532 that achieves improved color intensity when irradiated with ultraviolet light, particularly with short wave UV light, as compared to the prior art.

SUMMARY OF THE DISCLOSURE

This disclosure provides luminescent compositions having improved color intensity and articles incorporating said luminescent compositions as security taggants, for example as anti-counterfeiting components in pharmaceutical packaging applications, or as aesthetic colorants that are generally usable in any application where luminescent coloration is desired. The luminescent compositions incorporate a particulate fluoropolymer that is blended with one or more luminescent pigments and/or luminescent dyes. These components are provided in a liquid medium in which the fluoropolymer particles are dispersed and with which the pigment(s)/dye(s) may or may not be soluble.

More particularly, provided is a wet luminescent composition comprising:
 a) a liquid medium;
 b) particles of a fluorine-containing polymer dispersed in said liquid medium; and
 c) a luminescent agent in said liquid, wherein said luminescent agent luminesces upon the application of activating radiation.

Also provided is an article comprising:
 a) a substrate; and
 b) a dry luminescent composition on a surface of said substrate, said dry luminescent composition comprising a fluorine-containing polymer and a luminescent agent, wherein said luminescent agent luminesces upon the application of activating radiation.

Further provided is a process for forming a luminescent article, comprising:
 a) forming a wet luminescent composition comprising a blend of a liquid medium, a plurality of particles of a fluorine-containing polymer and a luminescent agent, wherein said luminescent agent luminesces upon the application of activating radiation, whereby said fluorine-containing polymer particles are dispersed in said liquid medium;
 b) applying the wet luminescent composition onto the surface of a substrate;
 c) evaporating the liquid medium to thereby form a dry luminescent composition; and optionally thereafter
 d) applying a protective layer onto said substrate, wherein said dry luminescent composition is between said substrate and said protective layer; wherein at least one of said substrate and said protective layer has a transparency to ultraviolet radiation in the 200 nm to 300 nm range in an amount of about 10% or more.

Still further provided is a method for authenticating an article comprising:

I) providing an article comprising:
   a) a substrate; and
   b) a dry luminescent composition on a surface of said substrate, said dry luminescent composition comprising a fluorine-containing polymer and a luminescent agent, wherein said luminescent agent luminesces upon the application of ultraviolet radiation;

II) applying ultraviolet radiation in the 200 nm to 400 nm range onto the luminescent composition;

III) determining a luminescent response resulting from the application of ultraviolet radiation; and IV) optionally comparing the luminescent response determined from step III) to a pre-selected control luminescent response.

DETAILED DESCRIPTION

The present disclosure provides luminescent compositions that are useful for the formation of anti-counterfeiting security films, including monolayer and multi-layer film constructions and articles formed therefrom, as well as processes for their formation. The luminescent compositions include one or more luminescent agents as well as one or more fluorine-containing polymers. The fluorine-containing polymers are provided in particulate form for combination with the luminescent agent(s) but are not necessarily particulates in their final form in/on end use articles. As used herein, a "luminescent agent" is a substance that is capable of, suitable for, or exhibiting luminescence. Such includes luminescent pigments and luminescent dyes which may be soluble or insoluble in water. A "luminescent composition" is any composition that incorporates one or more luminescent agents. Luminescent pigments and dyes are commercially available and those useful herein include those that luminesce upon the application of ultraviolet radiation in the 200 nanometer (nm) to 400 nm wavelength range onto the luminescent agent/composition.

In the most preferred embodiments, one or more luminescent agents comprise a short wavelength ultraviolet radiation activated, visible light fluorescing or phosphorescing composition. For the purposes of this disclosure, the short ultraviolet spectrum is taken to lie in the region of 200 nm to 300 nm, and the long ultraviolet spectrum is taken to begin at wavelengths greater than 300 nm to about 400 nm. The visible spectrum is taken to lie in the wavelength region of about 400 to about 700 nm. The near infra-red spectrum is taken to begin at wavelengths greater than about 700 nm and may be taken to end at 3000 nm. The luminescent composition is preferably also capable of multiple luminescent responses, such as described in commonly assigned U.S. Pat. No. 7,122,248 which is incorporated reference herein to the extent consistent herewith. For purposes of the present disclosure, luminescent responses or luminescence includes both fluorescence and phosphorescence, and luminescent responses are selected from the group consisting of phosphorescence or fluorescence. The luminescent responses of the luminescent compositions of the disclosure (also known as taggants) most preferably include activating radiation wavelengths in the short ultraviolet regions of the spectrum, but may also include wavelengths in the long ultraviolet regions of the spectrum in addition to or as an alternative to the short ultraviolet regions of the spectrum.

Luminescent pigments or dyes may be organic, inorganic or organometallic substances. Examples of thermally stable organic substances useful in the present disclosure are the compounds 4,4'-bis(2 methoxystyryl)-1,1'-biphenyl, 4,4'-bis (benzoaxazol-2-yl)stilbene, and 2,5-thiophenediylbis(5-tert-butyl-1,3-benzoxazole). Illustrative examples include compounds commercially available from Huntsman Corporation of The Woodlands, Tex. under the trade names UVITEX® FP, UVITEX® OB-ONE, and UVITEX® OB; and by Honeywell International Inc. of Morris Plains, N.J. under the tradename LUMILUX®. These compounds, when excited by ultraviolet radiation, fluoresce in the ultraviolet and visible regions of the spectrum.

Examples of inorganic substances useful in the present disclosure are $La_2O_2S:Eu$, $ZnSiO_4:Mn$, and $YVO_4:Nd$. These materials are sold commercially by Honeywell International Inc. under the trade names LUMILUX® Red CD 168, LUMILUX® Green CD 145 and LUMILUX® IR-CD 139, respectively. Each is excited by ultraviolet radiation. LUMILUX® Red CD 168 and LUMILUX® Green CD 145 luminesce in the visible and LUMILUX® IR-DC 139 luminesces in the infrared. Another useful substance is a rare earth oxysulfide sold commercially by Honeywell International Inc. under the trade name LUMILUX® Red UC 6. This material is excited by infrared radiation and luminesces in the visible portion of the electromagnetic spectrum. Additionally, several zinc sulfide compounds doped with metals such as silver, copper, aluminum or manganese are also sold commercially by Honeywell International Inc. and are useful herein. Several of these products are excited by UV and white light and respond with both fluorescence and phosphorescence and also are characterized as having the property of a long afterglow (LUMILUX® Green N5, N-PM and N2). Others are excited by UV radiation and luminesce in colors including blue, green, red, yellow and yellow-orange (LUMILUX® Effect: Blue A, Green A, Red A, Blue CO, Green CO Yellow CO and Yellow-Orange). Still others are excited by UV and white light and display fluorescence and phosphorescence (LUMILUX® Effect Blue SN and Blue SN-F, alkaline earth silicates; LUMILUX® Effect: Green N, Breen N-L, Green N-E, Green N-F, Green N-3F, Green N-FG, Green N-FF), and Green SN-F5, a strontium aluminate compound doped with europium and dysprosium; and LUMILUX® Effect Red N 100, a calcium sulfide compound doped with europium and thulium, which is activated by white light and responds with red fluorescence and phosphorescence. Mixtures of such materials can also be used and some mixtures are available commercially (LUMILUX® Effect Sipi: Yellow and Red).

Particularly useful are all the luminescent compositions that are described in U.S. Pat. No. 7,122,248 to Tam et al. and U.S. pre-grant publication 2003/0194578 to Tam et al, each of which is commonly-assigned to the present assignee and incorporated herein by reference to the extent consistent herewith. Also particularly preferred are LUMILUX® Red CD 380, and LUMILUX® Green CD 393, which are polar-solvent soluble, short wavelength ultraviolet radiation activated ((280 nm excitation maximum, negligible excitation above 300 nm), visible light luminescing rare earth complexes; LUMILUX® Yellow CD 382, which is a long and (weakly) short wavelength UV activated fluorescent Salicylic acid derivative pigment, and LUMILUX® Red CD 740, which is a long and (weakly) short wavelength UV activated luminescent oxinate pigment. A short wavelength UV activated pigment like LUMILUX® Red CD 380 may optionally be employed in combination with additional visible fluorescing taggants activated by long wavelength ultraviolet radiation, such as LUMILUX® CD 797 or CD 997, and/or activated by infrared radiation, such as LUMILUX® Green UC-2 (an infrared activated rare-earth oxysulfide pigment). The wavelengths of the fluorescent or phosphorescent emissions may also be varied by altering the chemical identities of the individual taggants.

U.S. Pat. Nos. 5,424,006 and 5,674,437, which are incorporated herein by reference to the extent consistent herewith, describe a particular class of phosphorescent substances and methods for their manufacture, that have long afterglow qualities and are useful in the articles of the present disclosure since the rate of decay of luminescence can be used as one of the verifiable features of such articles. U.S. Pat. No. 5,674,437 discloses incorporating such materials in fibers. The phosphorescent substances are generally described as doped metal aluminate oxide pigments, wherein the metal can be, e.g., calcium, strontium, barium or mixtures thereof and the dopants are preferably europium and an element selected from the group consisting of elements of the Lanthanide series of the Periodic Table of the Elements including lanthanum, cerium, praseodymium, neodymium, samarium, gadolinum, dysprysium, holmium, erbium, thulium, ytterbium and lutetium, and tin and bismuth. An example is $SrAl_2O_4$:Eu Dy, as described in U.S. Pat. No. 5,424,006. Like the other pigments described above, these pigments are available under the tradename LUMILUX® available from Honeywell International Inc.

As used herein, a "fluorine-containing" polymer is a polymer that includes fluorine atoms. Such includes fluoropolymer homopolymers, fluoropolymer copolymers and/or fluorocarbon-containing materials, i.e. fluorocarbon resins. A "fluorocarbon resin" generally refers to polymers including fluorocarbon groups. Preferred fluoropolymers include homopolymers, copolymers and blends thereof as are well known in the art. Of these, particularly preferred fluoropolymers include homopolymers and copolymers of chlorotrifluoroethylene, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof. As used herein, copolymers include polymers having two or more monomer components. Most preferred are hydrochlorofluoropolyolefins (HCFPOs), such as chlorotrifluoroethylene homopolymers or chlorotrifluoroethylene containing copolymers, including particularly CTFE-VF2 (chlorotrifluoroethylene-vinylidene fluoride) copolymers. Such are available as ACLON® resin from Honeywell International Inc. of Morristown, N.J.

The fluorine-containing polymers as used in the present disclosure are prepared by methods well-known in the art and are most commonly produced as particles in water by aqueous dispersion polymerization, such as the methods described in U.S. Pat. Nos. 5,453,477; 5,955,556; 6,255,384; 6,365,684 and 6,369,178, which are incorporated herein by reference to the extent consistent herewith. U.S. Pat. No. 5,453,477 teaches stable polychlorotrifluoroethylene (PCTFE) polymer suspensions which exhibit a low tendency to coagulate and exhibit good wettability of the particles in the absence of soaps. The particulate suspensions are formed by polymerizing monomeric reactants in water in a reactor vessel with a redox initiator system. The fluorine-containing polymer particles formed by the process have an average particle size ranging from about 0.01 µm to about 1.0 µm, with excellent particle size uniformity. U.S. Pat. Nos. 5,955,556; 6,255,384 and 6,365,684, all of which are related, teach the polymerization of fluoroolefins as well as combinations of fluoroolefins and non-fluoroolefins. This reaction is also conducted in water in a reactor vessel with a redox initiator system.

In accordance with the present disclosure, the luminescent compositions may be produced by mixing the luminescent agent(s) with the fluorine-containing polymer particles inside the polymerization reactor together with the water medium after polymerization of the fluorine-containing polymer has been completed, or the luminescent agent(s) may be added to the mixture/dispersion of fluorine-containing polymer particles in water any time after the completion of the polymer polymerization process in a separate vessel, which vessel may be used for preparation, storing and application of the luminescent agent(s)/polymer mixture. In this regard, each of U.S. Pat. Nos. 5,453,477; 5,955,556; 6,255,384; and 6,365,684 teach that the amount of water charged to the reaction vessel for the polymerization reaction is not critical and is generally directly proportional to the internal volume of the vessel. For example, U.S. Pat. Nos. 5,955,556; 6,255,384; and 6,365,684 teach that in a 1 gallon (3.8 liter) reactor, about 1 liter to about 3 liters of water may be used. This is generally the case as well in accordance with the present disclosure. However, the amount of water will generally dictate the amount of luminescent agent(s) used to form the luminescent compositions of the disclosure. In this regard, in a luminescent composition of the present disclosure, the fluorine-containing polymer particles comprise from about 1% by weight to about 80% by weight of the composition, more preferably from about 1% to about 50% by weight and most preferably from about 1%-20% of the liquid (wet) luminescent composition and most preferably from 1% by weight to about 5% by weight, based on the combined weight of the fluorine-containing polymer particles, the luminescent agent(s), the liquid medium and any other optional additives. Said fluorine-containing polymer particles also preferably have an average particle size ranging from about 0.01 µm to about 1.0 µm, even if they are produced by method other than those of the U.S. patents identified above. When optional additives are incorporated, they are preferably incorporated within the wet luminescent composition in a concentration of about 10 weight % or less, based on the combined weight of the fluorine-containing polymer particles, the luminescent agent(s), the liquid medium and any other optional additives. Examples of optional additives non-exclusively include dispersants, surfactants, anti-settling agents, rheology modifiers, other colorants and other performance enhancing agents.

The luminescent agents are incorporated in concentrations suitable for obtaining a desired luminescent effect of the dry luminescent composition. The minimum concentration of luminescent substances in the dry luminescent composition is preferably at least about 0.05 weight percent, more preferably at least about 0.10 weight percent, still more preferably about 0.50 weight percent based on the weight of the fluorine-containing polymer, the luminescent agent(s)

and any optional additives. Conversely, the maximum concentration of one or more luminescent agents will be determined by the application, the physical properties of the article that need to be achieved, e.g. ease of fabrication, cost considerations, etc. Typically, the maximum concentration of the luminescent agent in the dry luminescent composition is about 85 weight percent, more preferably about 50 weight percent, and still more preferably from 0.05 wt. % to about 40.0 wt. %, and 0.1 wt. % to about 40.0 wt. % or from about 15.0 wt. % to about 40.0 wt. %. Still more preferably, the concentration of the luminescent agent in the dry composition is less than about 25 weight percent, still more preferably a less than about 20 weight percent, with more preferred ranges of from about 0.1 wt. % to about 10 wt. %, or about 0.1 wt. % to about 2.5 wt. % or about 2.5 wt. % to about 10 wt. %. In a most typical dry luminescent composition, the luminescent agents in the dry composition will comprise no more than about 10 weight percent based on the weight of the fluorine-containing polymer, the luminescent agent(s) and any optional additives.

In order to achieve such luminescent agent concentrations in the dry luminescent composition, the one or more luminescent agents preferably comprise from about 0.005% by weight to about 30% by weight of the liquid (wet) luminescent composition, more preferably from about 0.005% by weight to about 20% by weight, more preferably from about 0.005% to about 10% by weight, still more preferably from about 0.005% to about 5% by weight, still more preferably from about 0.005% to about 5% by weight, still more preferably from about 0.005 wt. % to about 1.0 wt. %, and most preferably from about 0.005 wt. % to about 0.5 wt. % of the liquid (wet) luminescent composition, based on the combined weight of the fluorine-containing polymer particles, the luminescent agent(s), the liquid medium and any other optional additives. At the lower end of the useful range, the luminescent agent concentrations may comprise from 0.005 wt. % to 0.06 wt. %, 0.06 wt. % to 0.4 wt. %, or 0.4 wt. % to 1.0 wt. % of the wet composition based on the combined weights of the fluorine-containing polymer particles, the luminescent agent(s), the liquid medium and any other optional additives. Generally, the concentration of the luminescent agents in the dry luminescent composition will be approximately 2× the concentration of the luminescent agents in the wet luminescent composition, but preferably are not present in an amount of greater than 50% by weight of the overall dry composition after evaporation/removal of the liquid medium. In other words, the luminescent agents in the dry composition preferably comprise from about 1.0% by weight to about 50% by weight of the liquid (wet) luminescent composition, more preferably from about 1.0% by weight to about 40% by weight, more preferably from about 1.0% to about 20% by weight, still more preferably from about 1.0 to about 10%, but most preferably from about 1.0% to about 5% by weight of the dry luminescent composition, based on the combined weight of the fluorine-containing polymer particles, the luminescent agent(s) and any other optional additives. However, other amounts, including amounts of >0% to 1.0 wt. % and greater than 50 wt. % may also be useful depending on the application and interests of the manufacturer. Further, in all of these embodiments, it is most preferred that the balance of the dry composition consists of only the fluorine-containing polymer with no additional additives.

As taught in each of U.S. Pat. Nos. 5,453,477; 5,955,556; 6,255,384; and 6,365,684, the fluoropolymer polymerization reactions they describe are conducted in a pressurizable, stainless steel reactor equipped with a mechanical agitator/stirrer to mix the reactor contents, and having conventional inlet and outlet ports. The mechanical stirrer comprises a rotatable shaft fitted with two sets of four blades each, wherein each set of blades may be generally described as flat paddle blades set at an angle of approximately 45° relative to the shaft. The two sets of blades are located upon the shaft with a proximal spaced-apart distance of approximately six inches, and further, the direction of the angle of each of one set of blades is preferably in a direction opposite to that of the other set of blades. The other end of the shaft is affixed to an electric motor which is used to rotate the shaft. A vessel having this type of configuration is most preferred for mixing the components of the wet luminescent compositions of the present disclosure because it will achieve effective mixing of the vessel contents. However, such is not intended to be limiting and vessels without such a stirrer, or with a different type of stirrer, are also useful for suitably mixing the components of the luminescent compositions described herein.

The fluorine-containing polymer particles, the one or more luminescent agents and any other optional additives are thoroughly mixed within in the liquid medium, preferably until the fluorine-containing polymer particles are uniformly dispersed within the liquid medium. If the luminescent agent(s) is/are soluble in the liquid medium, mixing is preferably continued until the agent(s) are completely dissolved in the liquid medium. If the luminescent agent(s) is/are insoluble in the liquid medium (thereby also being in particulate form), mixing is preferably continued until the agents(s) are uniformly dispersed within the medium along with the fluorine-containing polymer particles. The mixing process may be conducted with or without a surfactant and without coagulation or flocculation of the polymer/agent particles.

In the polymerization processes of each of U.S. Pat. Nos. 5,453,477; 5,955,556; 6,255,384 and 6,365,684, the liquid medium is preferably purified, degassed, deionized water, and this liquid medium is also most preferred herein, and as noted above, the one or more luminescent agents may be mixed with the fluorine-containing polymer particles inside the reactor vessel after the polymerization process has been completed. However, mixing the components and forming the luminescent composition within the reactor vessel is not mandatory and a fresh supply of water may be used (preferably a fresh supply of purified, degassed, deionized water) and mixed with the fluoropolymer particles and luminescent agent(s) in a different vessel, or any other appropriate solvent/liquid medium may be used, including polar and non-polar solvents. Suitable solvents non-exclusively include alcohols, esters, ketones, halogen containing organic solvents and hydrocarbon solvents, and the luminescent agent(s) and liquid medium may be combined using common mixing or blending techniques to form the luminescent composition.

As described in U.S. Pat. Nos. 5,453,477; 5,955,556; 6,255,384 and 6,365,684, after polymerization is completed and an aqueous particulate fluorine dispersion is produced, the water medium is driven off by any conventional means including evaporating, freeze-drying the aqueous suspension, or any other means, such as by the optional addition of a minor amount of an agglomerating or coagulating agent followed by filtration or centrifuging. Accordingly, the remaining particulate fluoropolymer may thereafter be mixed with the one or more luminescent agents, the liquid medium (e.g., a fresh supply of purified, degassed, deionized water), and any optional additives that may be desired, in any suitable reactor vessel with any suitable liquid medium/solvent.

In the most preferred embodiments of the disclosure, the liquid medium is purified, degassed, deionized water and the luminescent agent(s) is/are water-soluble and are dissolved by the water medium, thereby producing a wet, liquid luminescent composition comprising a luminescent solution that serves as a dispersing medium for the particulate fluorine-containing polymer. In said composition, it is most preferred that the fluorine-containing polymer particles comprise from about 1% by weight to about 80% by weight of the composition and the one or more luminescent agents comprises from about 0.5% by weight to about 30% by weight of the wet, liquid composition. Alternatively, the luminescent agent(s) may be insoluble in the liquid medium and, like the fluorine-containing polymer particles, be in particulate form and dispersed in the liquid medium.

Once the luminescent composition is obtained, it may be utilized in a variety of applications wherein it is applied without the need to further mix the composition with any binders or other carriers. This ability to eliminate such a binder or carrier achieves improved color intensity when irradiated with UV light, particularly with short wave UV light, as compared to the prior art because such binders/carriers often interfere with short UV wave and long UV wave transmission.

In one embodiment, the luminescent composition may be printed, coated or otherwise applied as a liquid onto the surface of a substrate. Generally, the composition may be applied onto any type of substrate without limitation. In one preferred application it is applied to a polymer substrate, which substrate is preferably a polymer film having a transparency to ultraviolet radiation in the 200 nm to 400 nm range in an amount of about 10% or more, more preferably having a transparency to ultraviolet radiation in the 200 nm to 300 nm range in an amount of about 10% or more. More preferably, a polymer film substrate has a transparency to ultraviolet radiation in the 200 nm to 300 nm wavelength range in an amount of about 70% or greater, even more preferably in an amount of about 80% or greater, still more preferably in an amount of about 90% percent or greater and most preferably has a transparency to such short wavelength ultraviolet radiation in an amount of about 99% or greater. Suitable substrates may also or alternatively have a transparency to ultraviolet radiation in the 300 nm to 400 nm wavelength range in an amount of about 70% or greater, an amount of about 80% or greater, an amount of about 90% percent or greater or an amount of about 99% or greater.

In the preferred embodiment of the disclosure, the substrate comprises a fluoropolymer film. Preferred fluoropolymers include homopolymers, copolymers and blends thereof as are well known in the art and are described in, for example, U.S. Pat. Nos. 4,510,301; 4,544,721; and 5,139,878. Of these, particularly preferred fluoropolymers include homopolymers and copolymers of chlorotrifluoroethylene, ethylene-tetrafluoroethylene copolymer, fluorinated ethylene-propylene copolymer, perfluoroalkoxyethylene, polychlorotrifluoroethylene, polytetrafluoroethylene, polyvinyl fluoride, polyvinylidene fluoride, and copolymers and blends thereof. As used herein, copolymers include polymers having two or more monomer components. Most preferred are chlorotrifluoroethylene homopolymers or chlorotrifluoroethylene containing copolymers. Such are available as ACLON® resin from Honeywell International Inc. which is also available from Honeywell International Inc. as ACLAR® films. ACLAR® PCTFE fluoropolymer films are crystal clear, chemically stable, biochemically inert films that provide an excellent moisture barrier for a clean, thermoformable film. They are plasticizer and stabilizer free, and provide up to 10 times the moisture barrier of other transparent blister packaging films. ACLAR® PCTFE fluoropolymer films also exhibit antistatic, and excellent electrical properties, can be laminated and metallized and are preferred by pharmaceutical companies for blister packaging and other health care packaging.

Techniques for producing coatings on substrates include conventional methods such as dip coating, meniscus coating, roller coating, doctor blade coating, spraying and the like which are well known in the art, and using conventional coating means. For example, the liquid (wet) luminescent composition may be added to a substrate by casting it onto the substrate using conventional means such as spray, roller, knife, curtain or gravure coaters, or any other method that permits the application of a uniform coating without streaks or other defects. Spray and roller applications are the most convenient application methods. The liquid medium is then evaporated/dried, leaving behind only the luminescent agent and the particulate polymer. Drying may be achieved by passive means, such as allowing the liquid to air dry at ambient temperatures, or actively by heating in an oven to accelerate the drying process. Drying temperatures are preferably in the range of from about 20° C.-25° C. (ambient room temperature) to about 200° C. Methods of oven drying are conventionally known in the art.

The cast composition, which includes the luminescent agents and the particulate polymer, has a preferred dry coating thickness of from about 12 microns to about 250 microns, preferably from about 30 microns to about 130 microns. After the set composition has been dried to remove the liquid medium, the components in the applied coatings, i.e., the fluorine-containing polymer particles and the dye(s) and/or pigment(s), are coalesced together into a dried film or coating (i.e., a dry luminescent composition) on the substrate. Preferably the coating is thermally coalesced whereby the fluorine-containing polymer particles are melted and form a coating on the substrate, which may be a continuous, uniform coating. In this regard, the fluorine-containing polymer particles may be thermally coalesced by heating the coating to a temperature of from about 150° C. to about 250° C., depending on the melting point of the polymer, the thickness of the cast dispersion and the substrate film, and other operating conditions. Alternatively, depending on the type of liquid medium used, it may be possible to coalesce the fluorine-containing polymer particles together with each other and with the luminescent agent(s) prior to removal/drying of the liquid medium. The coating formed from coalesced polymer particles is most preferably in the form of a continuous film.

Alternatively, the luminescent composition may be applied in the form of a pattern or patterned indicia as an added security feature. Such patterns include printed words and images. In this embodiment, if the liquid composition incorporating the dispersed fluorine-containing polymer particles is applied to a substrate in the form of patterned indicia, coalescing of the polymer particles will achieve continuous indicia in the form of the printed numbers, letters and/or symbols. Alternatively, the luminescent composition may be optionally be applied in dry form after drying/removal of the liquid medium, although application a wet, liquid composition is most preferred.

It should be understood that while the process of the disclosure has heretofore been described with reference to applying the luminescent composition onto a substrate that has a transparency to ultraviolet radiation in the 200 nm to 300 nm range in an amount of about 10% or more, it is also within the scope of the disclosure that the luminescent composition may first be applied onto substrate followed by attaching a protective receiver layer onto the substrate, such that the luminescent composition is positioned between the substrate and the receiver layer. This receiver layer may serve many purposes, but generally serves as a barrier isolating the taggant (luminescent agents) and preventing contact of the luminescent composition with a consumer product. Accordingly, the receiver layer is preferably attached to the substrate whereby the luminescent composition is positioned between the substrate and the receiver layer. When a receiver layer is incorporated, the substrate and receiver layer may be attached to each other by well-known lamination techniques or other conventional methods allowing the luminescent composition to be positioned intermediate to the two layers.

It is within the scope of this disclosure that multiple receiver layers may be attached to the substrate and to each other so long as the transparency of the overall multilayer structure is sufficient to irradiate the luminescent composition with ultraviolet radiation in the 200 nm to 300 nm range, and/or ultraviolet radiation in the 300 nm to 400 nm range, resulting in a visible luminescent response. However, this does not require that the receiver layer have transparency to ultraviolet radiation in the 200 nm to 300 nm range, and/or ultraviolet radiation in the 300 nm to 400 nm range.

Suitable receiver layers non-exclusively include those formed from polyolefins including polyethylenes and cyclic olefin copolymers, polyamides, ethylene vinyl acetate copolymers, ethylene vinyl alcohol copolymers, polyesters such as polyethylene terephthalate, polyvinyl chloride, polyvinylidene chloride, polystyrene, styrenic copolymers, polyisoprene, polyurethanes, ethylene ethyl acrylate, ethylene acrylic acid copolymers, fluoropolymers, polyacrylics, polyalcohols, polyethers, polyketones, polycarbonates, polysulfides, cellulosic and polyvinyl derivatives and blends of the foregoing materials. Suitable receiver layers also include non-polymer layers such as metal foils, e.g. aluminum foil, or paper or cardboard as is known in the art, and in this regard, the luminescent agent(s) is/are activated by light to which only the substrate is transparent, e.g. ACLAR®. Articles of the disclosure may also be constructed with materials allowing visible or other identification by exposure to invisible light with at least one of the taggants through only one side of the article construction, while allowing visible or other identification with one or more additional taggants through another side or both sides of the construction. This special feature adds additional security to films of the disclosure. For example, a receiver layer may comprise polyvinyl chloride (PVC) which provides compatibility with heat sealants typically used to fuse a foil construction with a plastic laminate in drug-containing blister pack constructions, as is well known in the art.

Although each of the substrate, optional receiver layer and luminescent composition coating may have a different thickness, the thickness of each is preferably from about 1 µm to about 500 µm, more preferably from about 3 µm to about 375 µm, and most preferably from about 50 µm to about 250 µm. While such thicknesses are preferred, it is to be understood that other film thicknesses may be produced to satisfy a particular need and yet fall within the scope of the present disclosure. Each of a polymeric substrate and optional polymeric receiver layer, or a combination thereof, may be monoaxially or biaxially oriented. For example, the substrate may be oriented to a draw ratio of from 1.5:1 to 5:1 uniaxially in at least one direction, i.e. its longitudinal direction, its transverse direction or biaxially in each of its longitudinal and transverse directions. For the purposes of the present disclosure the term draw ratio is an indication of the increase in the dimension in the direction of draw. A substrate and receiver layer may be simultaneously biaxially oriented after they are attached to each other. Biaxial orientation has been found to result in dramatic improvements in clarity, strength and toughness properties.

The luminescent compositions are particularly useful in the formation of shaped packaging articles having security features, such as blister packages used for packaging pharmaceutical products. They are also particularly useful for the fabrication of other articles including labels and identification documents such as passports and laminated identification cards, currency and banknotes, negotiable instruments, stocks and bonds, licenses including drivers' licenses, diplomas, credit and debit cards, security identification cards, automatic teller machine (ATM) or banking access cards, and other important documents or shaped articles and containers for which anti-counterfeiting or other security or information features are desirable. In any embodiment, the placement of the luminescent composition will be readily determined by one skilled in the art, whether being applied directly on a surface of an article or being applied on a substrate/film that is applied to/on an article. Accordingly, it should be understood that a "substrate" as described herein is to be interpreted broadly to mean any surface to which the luminescent composition may be applied, including non-polymeric film surfaces such as foils, metals, paper and other fiber-based substrates such as fabrics, as well as any polymeric film layer without limitation, including both opaque and transparent polymer films, etc., nor must the substrate be in the form of a film or layer. Additionally, it is also not mandatory for the composition as applied on a substrate to be covered by a protective film or coating, and as such the transparency of the substrate to a particular range of activating radiation is not relevant. The transparency of a substrate (and/or protective layer and/or receiver layer) to a particular range of activating radiation is only relevant when the luminescent composition is to be subjected to activating radiation through that substrate (and/or through the protective layer and/or through the receiver layer).

The presence or absence of a luminescent composition or taggant in a security article is determined by an appropriate activation and detection system, including artificially manufactured activators and detectors, and/or artificially manufactured activators and natural detection methods by visual observation of effects resulting from the activation. The identity of the construction prepared as described above may be confirmed by observing the existence and color of emitted fluorescent and/or phosphorescent light upon irradiation of the construction alternately on each side of the laminate with a selection of irradiating wavelengths determined by the optimum excitation wavelength of each luminescent agent taggant. For example, a typical laboratory UV lamp can be set to emit at short, medium and long wavelength UV, e.g., 254, 302 and 365 nanometers, respectively. For example, exposure of an article incorporating a LUMILUX® CD 380 taggant with 254 nm radiation would activate the LUMILUX® CD 380 taggant to emit visible luminescent red light. Exposure with 365 nm light would activate a LUMILUX® CD 797 or CD 997 taggant to emit fluorescent yellow light. Exposure with a near infrared hand-held laser, emitting at about 980 nm, would activate a LUMILUX® UC-2 taggant to emit luminescent green light. Methods of detecting taggant compounds and detecting devices are known and described, for example, in U.S. Pat. Nos. 5,719,948; 5,714,291; 5,666,417; 5,605,738; 5,574,790; 5,548,106; 5,418,855; 5,414,258; 4,642,526; 4,146,792; 3,164,603; 3,162,642; and 3,066,105, which are incorporated herein by reference to the extent consistent herewith. For the purposes of the disclosure, an appropriate detector is one that is at least capable of applying short wavelength ultraviolet radiation in the 200-300 nm range of the electromagnetic spectrum to the luminescent agent(s) of the disclosure.

In use, one forms an article such as a multilayer film including a substrate layer and receiver layer with a luminescent composition positioned between said layers, as described above. An article is tested for authenticity by applying ultraviolet radiation, for example in the 200 nm to 300 nm range (or generally at any wavelength within the 200 nm to 400 nm range), onto the luminescent composition. A luminescent response is then determined which results from the application of said ultraviolet radiation. This resulting luminescent response may then be compared to a standard (e.g. control) or known luminescent response from an article which is known to be authentic. Typically, this is performed visually by an observer alone or with the aid of an instrument. An authentic article may have the luminescent composition printed in a known pattern of indicia or on a known portion of the article, or a luminescent composition with a specific spectral response may be used. An article is authentic if the expected response is observed and fails if the expected response is not observed.

The structures of this disclosure may also contain a plurality of different types of taggants, e.g., a combination of fluorescent and phosphorescent taggants, each preferably activated by ultraviolet radiation in the 200 nm to 300 nm range at distinctly different wavelengths, and potentially emitting a luminescent response at a variety of visible wavelengths, including non-visible wavelengths that require specialized detection equipment. In this regard, depending on the particular end use or article for which security characteristics are desired, it may be desirable to use a mixture of fluorescent and phosphorescent agents or it may be desired to use a mixture of fluorescent agents or a mixture of phosphorescent agents.

Typically, the luminescent effect (i.e., luminescence) can be described not only by the wavelength or color region of its emission, but also by the duration of time after removal of the excitation source during which the emission may be observed, characterized as decay time, half-life or the decay time constant tau. These decay times can then also be subdivided into several time domains: the true fluorescent decay time is typically in the nano- to pico-second time domain, and thus is readily observable by the human eye and many detection devices only during the time when the excitation source is present. These fluorophors are usually molecular organic dyes and pigments. Phosphorescent materials are typically crystalline inorganic materials, or chelated complexes of metal or lanthanide ions in an organic molecular matrix. Phosphors with decay times in the milliseconds time domain, which may be used in cathode ray tube applications, are more readily characterized for decay times with detection instrumentation (see the detection device patents referenced), but are not readily observed by the human eye. Such instrumental time decay characterization may also be used for authentication purposes, along with wavelength characterization. The emission decay of phosphors with decay times in the fractions of a second to a few seconds can be observed by the human eye, can also be characterized by appropriate instrumentation, and may also be used for authentication purposes. See, for example, U.S. Pat. No. 9,250,183, which is commonly-owned by Honeywell International Inc. and which is incorporated herein by reference. A phosphorescent effect therefore is an effect that is observable for a time after the activating light energy is terminated, such effect referred to herein as "afterglow." A "long-afterglowing" effect can be from greater than about 10 minutes and up to about 200 minutes or longer, for example, from about 15 minutes to about 120 minutes, or from about 15 minutes to about 60 minutes.

As stated above, the binder-free luminescent compositions of this disclosure achieve significantly improved color intensity when irradiated with UV light compared to the prior art because such binders often interfere with short UV wave and long UV wave transmission. Whether the compositions are used as taggants in packaging articles, such as blister packages used for packaging pharmaceutical products, or in or on labels and documents such as passports, identification cards, currency and banknotes, stocks, bonds, licenses, credit cards, etc., the compositions are virtually impossible to replicate and offer significant utility in a broad range of industries.

The following examples serve to illustrate the preferred embodiments.

EXAMPLE

Assessment of coated luminescent material performance in aqueous dispersion of PCTFE vs. Flexographic Ink ("Flexo Ink").

I. Preparation of Aqueous Fluorescent PCTFE and Flexo Ink Dispersions and Coated Samples An aqueous dispersion of fluoropolymer (CTFE-VF2 copolymer, Aclon® 400 Series Dispersion in water, also referred to herein as, "Milk," a trademark of Honeywell International Inc.) was prepared as a dispersion having 47% polymer solids. This copolymer had two main components: chlorotrifluoroethylene (CTFE) and 1,1-difluoroethylene (VF2; vinylidene fluoride; VDF). The polymer solids comprised 84 wt. % CTFE and 16 wt. % VF2. Detailed descriptions of typical preparations of these aqueous polymeric dispersions are given in the Examples described in U.S. Pat. No. 6,365,684 B1 and U.S. Pat. No. 6,369,178 B1, each of which is incorporated by reference herein to the extent consistent herewith.

Figure 1:
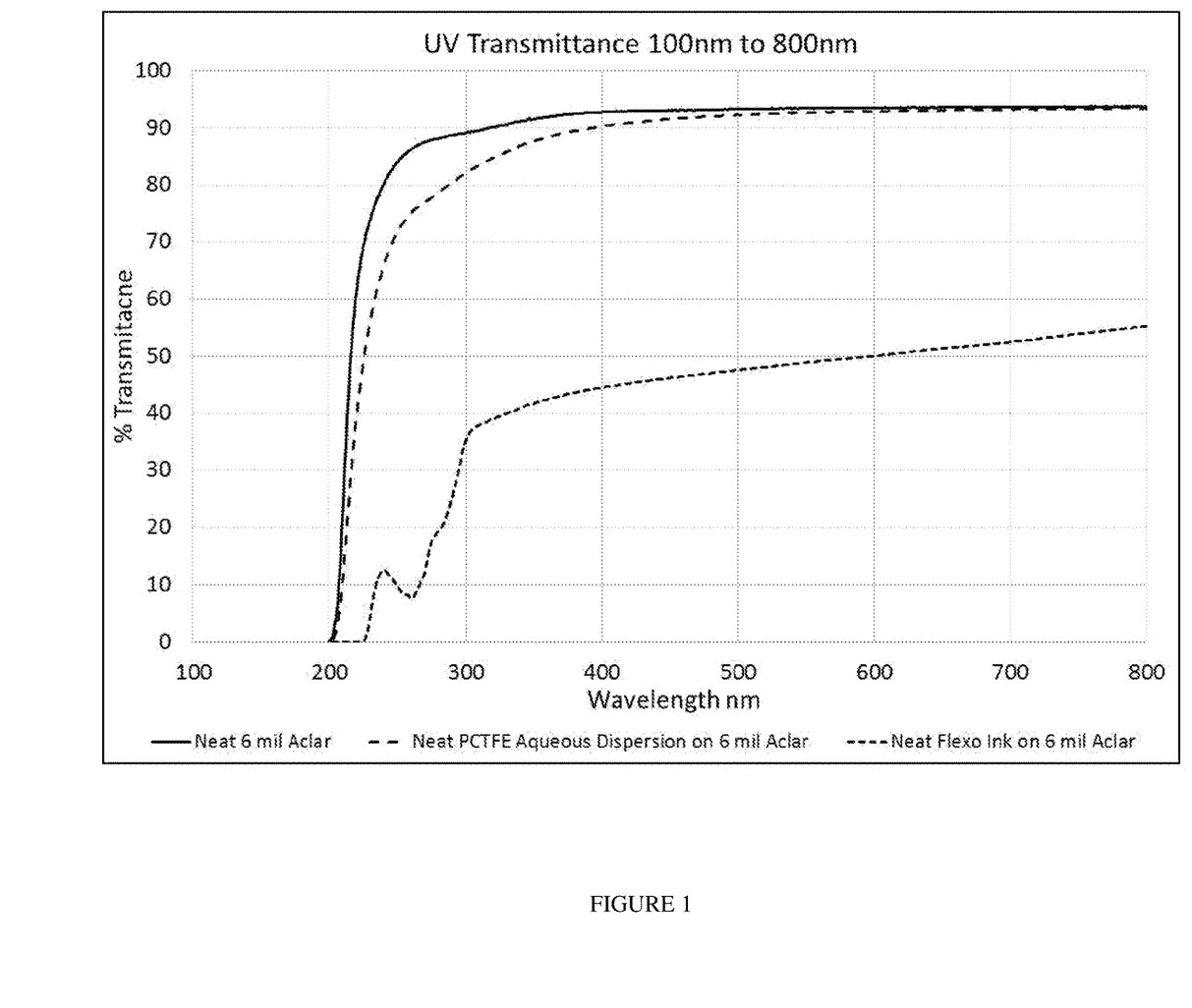
FIG. 1 is a graph illustrating the percentage of ultraviolet (UV) light transmittance for three different samples, each including no colorant/pigment.

The resultant finely dispersed polymer (Milk™) was then used to prepare coatings using an RDS #06 wire-wound coating rod on substrates for comparative testing. A first sample was prepared by coating the as-is dispersed Milk™ polymer onto a 6 mil PCTFE (Aclar®) film, and a second sample was prepared by coating an as-is Chromatic Technologies, Inc. Dynacolor™ Thermochromic Water Based Flexo Colorless Ink ("Flexo Ink") onto another 6 mil PCTFE (Aclar®) film. Each coated film was then tested with a UV/visible spectrometer for % light transmittance. The results are shown in FIG. 1, showing that the Milk™ dispersion coated on the 6 mil Aclar® film had a transparency similar to that of the film itself, particularly in the short-wave UV region from about 250 nm to 300 nm. The coated Flexo Ink sample was much less transparent in that region.

Samples of fluorescent Milk™ and fluorescent Flexo Ink were prepared by mixing intimately 1 part Lumilux® Red CD 380, a rare earth complex luminescent pigment for security coding, which is excited by short UV light only (280 nm excitation maximum, negligible excitation above 300 nm), with 19 parts Milk (Sample 1) or 19 parts Flexo Ink (Sample 2). The resultant fluorescent Milk and Flexo Ink samples containing 5% CD 380 were used to prepare coatings on a layer of 6 mil Aclar® (Samples 1A and 2A) and on metal foil typically used for pharmaceutical lid-stock (Samples 1B and 2B), which for this testing was Drug-Pak® brand foil commercially available from Winpak Ltd. of Winnipeg, Canada. All samples were mixed with a 2-roll mill for >10 min. A wound-wire coating rod RDS #06 was used to coat the samples on the Aclar® substrates. The expected wet film thickness was 15.2 microns. At 5% taggant (CD 380) loading, expected taggant laydown was ~0.76 g/m². The coated samples were allowed to air dry and are summarized in Table 1. Coating uniformity was good for all samples. The dried samples were tested for fluorescent emission properties as described below.

TABLE 1

| SAMPLE NUMBER | SUMMARY OF COATED SAMPLES | TEST TYPE |
|---|---|---|
| 1 | PCTFE (Milk) dispersion coated on 6 mil PCTFE (Aclar ®) film | UV/Visible Wavelength Transparency |
| 2 | Flexo Ink dispersion coated on 6 mil PCTFE (Aclar ®) film | UV/Visible Wavelength Transparency |
| 1A | PCTFE (Milk ™) dispersion with 5% CD 380 coated on PCTFE film | Fluorescent emission intensity, wavelength maximum and CIE [X, Y] color coordinates |
| 2A | Flexo ink dispersion with 5% CD 380 coated on PCTFE film | Fluorescent emission intensity, wavelength maximum and CIE [X, Y] color coordinates |
| 1B | PCTFE (Milk ™) dispersion with 5% CD 380 coated on metal foil | Fluorescent emission intensity, wavelength maximum and CIE [X, Y] color coordinates |
| 2B | Flexo Ink dispersion with 5% CD 380 coated on metal foil | Fluorescent emission intensity, wavelength maximum and CIE [X, Y] color coordinates |

II. Testing of Fluorescent Emission from Coated Samples

Fluorescent emission of the coated samples containing CD 380 was tested using a Konica-Minolta CS-1000 spectroradiometer with the sample mounted 26 inches from the detector, and a UVP 8W Model UVLMS-38 254 nm UV light source mounted 7 inches from and 45° to the sample. Samples 1A and 1B were coated on 6 mil PCTFE film (tested on white, optically neutral Leneta card stock). Samples 2A and 2B were coated on typical lid-stock metal foil, e.g., Drug-Pak® brand foil commercially available from Winpak Ltd. of Winnipeg, Canada. The results are shown in Table 2.

TABLE 2

Spectroradiometer Measurement of Coated PCTFE dispersions and Flexo Inks containing CD 380

| SAMPLE NUMBER | Color Intensity (Lv, cd/m²) | Color Coordinate CIE(X) | Color Coordinate CIE(Y) |
|---|---|---|---|
| CD 380 Product Data Information | — | 0.66 | 0.34 |
| 1A | 15.63 | 0.65 | 0.34 |
| 2A | 5.48 | 0.64 | 0.33 |
| 1B | 3.79 | 0.64 | 0.33 |
| 2B | 1.27 | 0.65 | 0.34 |

III. Testing Results Summary

Figure 2:
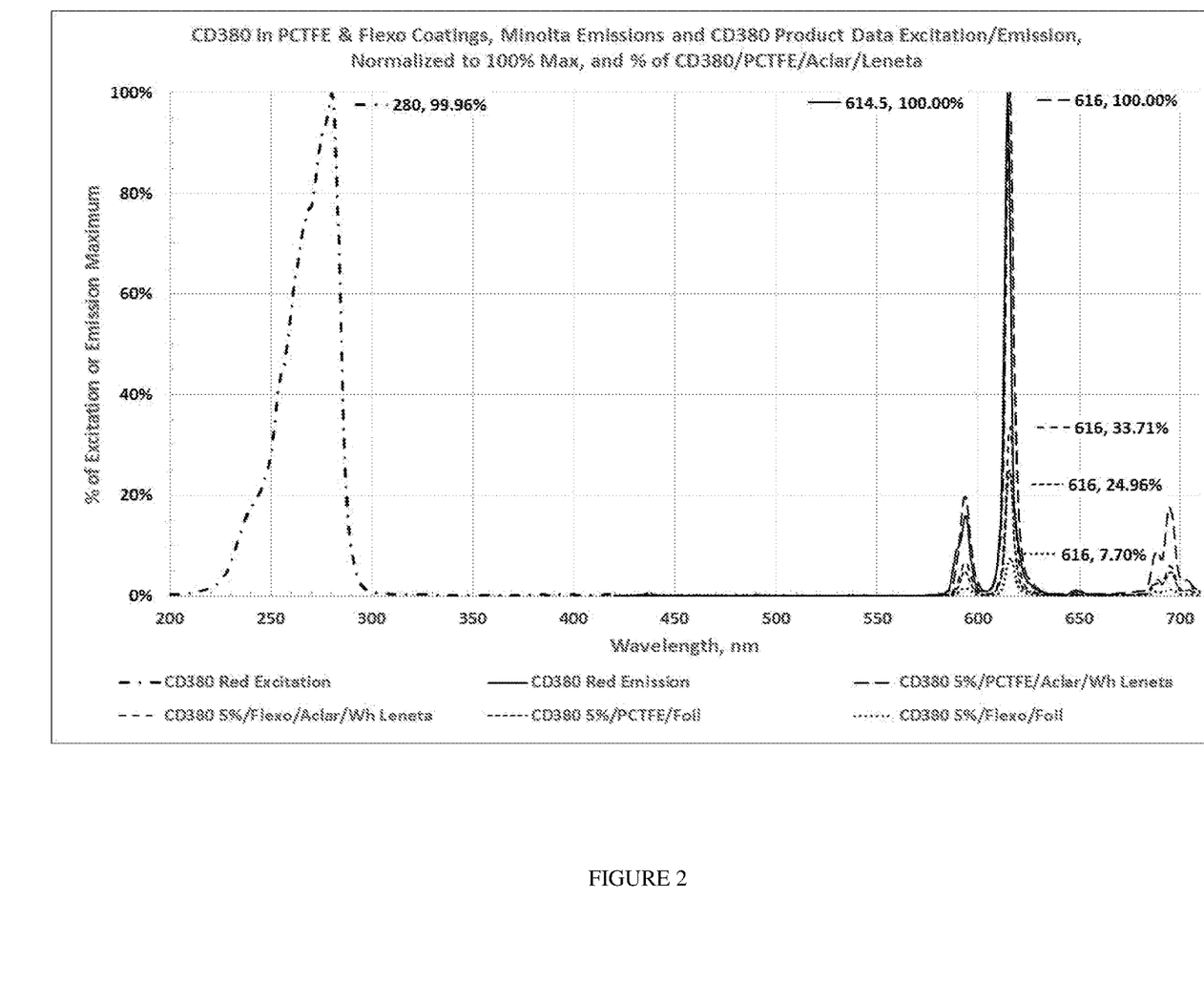
FIG. 2 is a graph illustrating the fluorescent excitation and emission spectra from Lumilux® Red CD 380 pigment and different samples including the pigment.
Figure 3:
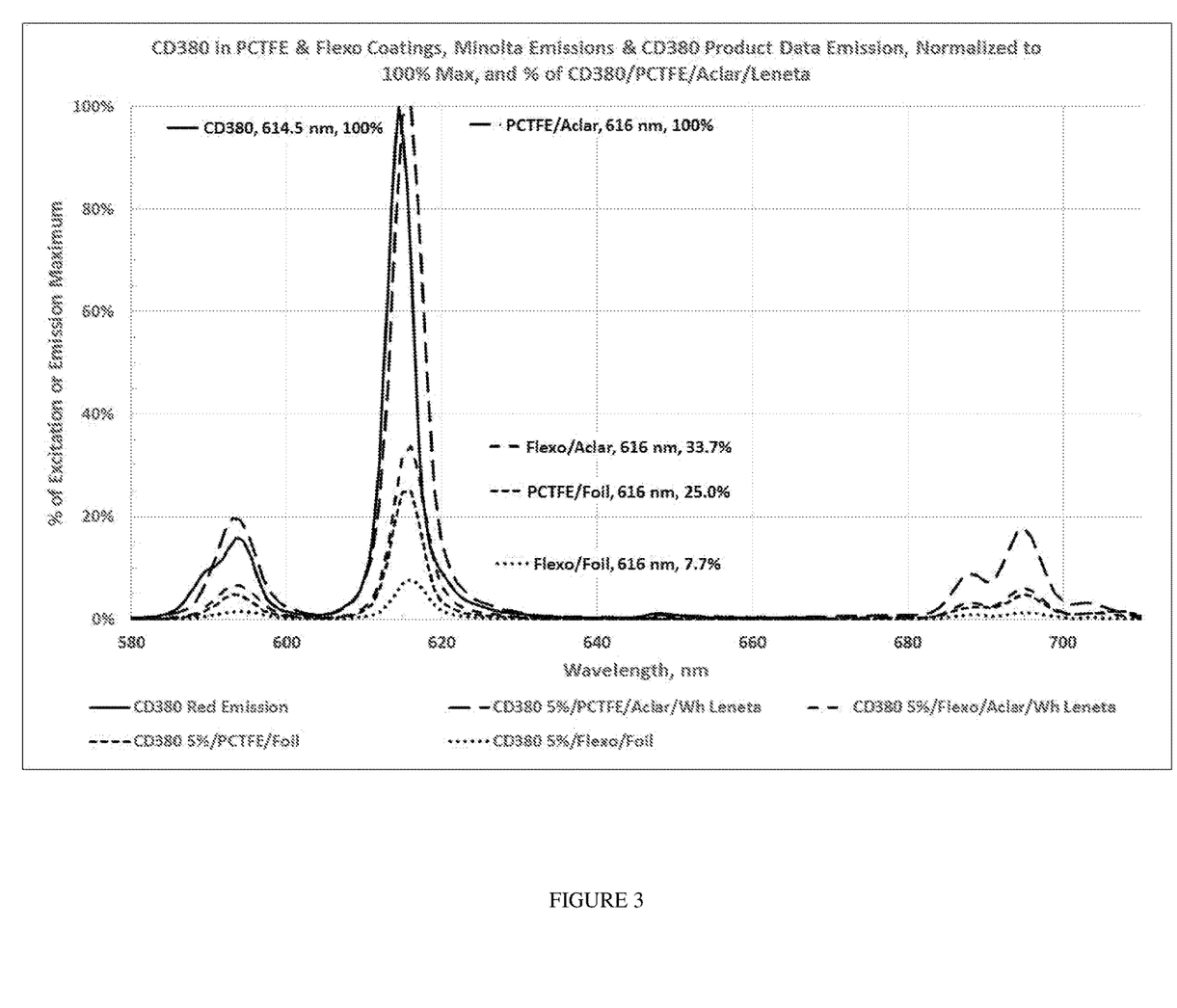
FIG. 3 is a graph illustrating the fluorescent emission spectra from Lumilux® Red CD 380 pigment and different samples including the pigment.

The test results are summarized graphically in FIGS. 1-3.

(A) FIG. 1 (UV transmittance samples with no CD 380) illustrates a comparison of light transmission of: (1) Aclar® having no coating thereon; (2) the Aclar® substrate coated with a PCTFE dispersion (Milk™); and (3) the Aclar® substrate coated with a Flexo Ink coating. All samples were neat, i.e., included no CD 380 colorant. The test results showed that the transmittance of the 254 nm light that is used to activate the CD 380 colorant is ~10 times greater through a coating of pure PCTFE than through the Flexo Ink coating.

(B) FIG. 2 (Testing of Fluorescent Emission from samples—Excitation and Emission Spectra) and FIG. 3 (Testing of Fluorescent Emission from samples—Emission Spectra) show that the fluorescent emissions of the PCTFE dispersion coatings on either the Aclar® substrate or the foil substrate are ~3× brighter than the Flexo Ink coatings made respectively on either the Aclar® substrate or the foil substrate; and either the PCTFE dispersion coatings or the Flexo Ink coatings on the Aclar® substrate are ~4× brighter than they are on the metal foil.

CONCLUSION

There is an enhanced luminescent emission advantage in coatings made using a dispersion of Lumilux® short-wave ultraviolet (SWUV) activated material in PCTFE (Milk™) vs. in a standard flexographic ink. The same results are achieved for coatings on other substrates, including paper.

While the present disclosure has been particularly shown and described with reference to preferred embodiments, it will be readily appreciated by those of ordinary skill in the art that various changes and modifications may be made without departing from the spirit and scope of the disclosure. It is intended that the claims be interpreted to cover the disclosed embodiment, those alternatives which have been discussed above and all equivalents thereto.

What is claimed is:

1. A wet luminescent composition comprising:
 a) a liquid medium;
 b) particles of a fluorine-containing polymer dispersed in said liquid medium; and
 c) a luminescent agent in said liquid medium, wherein said luminescent agent luminesces upon the application of activating radiation;
 wherein said fluorine-containing polymer particles consist essentially of particles of polychlorotrifluoroethylene, and wherein said liquid medium comprises water and wherein the luminescent agent comprises from about 0.05% by weight to about 40% by weight of the composition.

2. The wet luminescent composition of claim 1 wherein said luminescent agent comprises a luminescent pigment or luminescent dye.

3. The wet luminescent composition of claim 1 wherein said luminescent agent is soluble in and dissolved in the liquid medium.

4. The wet luminescent composition of claim 1 wherein said luminescent agent is insoluble in and dispersed in the liquid medium.

5. The wet luminescent composition of claim 1 wherein said luminescent agent luminesces upon the application of ultraviolet radiation in the 200 nm to 300 nm range onto the luminescent agent.

6. The wet luminescent composition of claim 1 wherein said fluorine-containing polymer particles have an average particle size of from about 0.01 μm to about 1.0 μm.

7. A wet luminescent composition comprising:
a) a liquid medium;
b) particles of a fluorine-containing polymer dispersed in said liquid medium; and
c) a luminescent agent in said liquid medium, wherein said luminescent agent luminesces upon the application of activating radiation;
wherein said fluorine-containing polymer particles consist essentially of particles of polychlorotrifluoroethylene, and wherein the fluorine-containing polymer particles comprise from about 1% by weight to about 80% by weight of the composition.

8. A wet luminescent composition comprising:
a) a liquid medium;
b) particles of a fluorine-containing polymer dispersed in said liquid medium; and
c) a luminescent agent in said liquid medium, wherein said luminescent agent luminesces upon the application of activating radiation;
wherein said fluorine-containing polymer particles consist essentially of particles of polychlorotrifluoroethylene, and wherein the luminescent agent comprises from about 0.5% by weight to about 30% by weight of the composition.

9. An article comprising a substrate having the wet luminescent composition of claim 1 on a surface thereof.

10. The article of claim 9 wherein said substrate comprises a fluorine-containing polymer layer.

11. An article comprising:
a) a substrate; and
b) a dry luminescent composition on a surface of said substrate, said dry luminescent composition comprising a fluorine-containing polymer and a water-soluble luminescent agent, wherein said luminescent agent luminesces upon the application of activating radiation;
wherein said fluorine-containing polymer consists essentially of polychlorotrifluoroethylene and wherein the luminescent agent comprises from about 0.05% by weight to about 40% by weight of the composition.

12. The article of claim 11 wherein said luminescent agent comprises a water-soluble, luminescent pigment or luminescent dye.

13. The article of claim 11 wherein said luminescent agent luminesces upon the application of ultraviolet radiation in the 200 nm to 300 nm range onto the luminescent agent.

14. The article of claim 11 wherein said substrate comprises a fluorine-containing polymer layer.

15. The article of claim 11 further comprising a protective layer on said substrate, wherein said dry luminescent composition is between said substrate and said protective layer, and wherein at least one of said substrate and said protective layer has a transparency to ultraviolet radiation in the 200 nm to 300 nm range in an amount of about 10% or more.

16. The article of claim 11 wherein said dry luminescent composition is present in the form of patterned indicia.

17. A process for forming a luminescent article, comprising:
a) forming a wet luminescent composition comprising a blend of a liquid medium, a plurality of particles of a fluorine-containing polymer and a water-soluble luminescent agent, wherein said luminescent agent luminesces upon the application of activating radiation, whereby said fluorine-containing polymer particles are dispersed in said liquid medium;
b) applying the wet luminescent composition onto a surface of a substrate;
c) evaporating the liquid medium to thereby form a dry luminescent composition; and optionally thereafter
d) applying a protective layer onto said substrate, wherein said dry luminescent composition is between said substrate and said protective layer;
wherein said fluorine-containing polymer consists essentially of polychlorotrifluoroethylene.

18. The process of claim 17 wherein at least one of said substrate and said protective layer has a transparency to ultraviolet radiation in the 200 nm to 300 nm range in an amount of about 10% or more.

19. A dry luminescent composition comprising a fluorine-containing polymer and a luminescent agent, wherein said luminescent agent luminesces upon the application of activating radiation; wherein said fluorine-containing polymer consists essentially of polychlorotrifluoroethylene, and wherein the luminescent agent comprises from about 0.05% by weight to about 40% by weight of the composition.

20. The dry luminescent composition of claim 19 wherein said luminescent agent comprises a water-soluble luminescent agent and/or wherein the luminescent agent comprises from about 0.5% by weight to about 30% by weight of the composition.

* * * * *